(12) United States Patent
Kim et al.

(10) Patent No.: US 6,931,015 B2
(45) Date of Patent: Aug. 16, 2005

(54) CONTROL PROGRAM STRUCTURE OF ATM SWITCHING SYSTEM AND METHOD THEREOF

(75) Inventors: Young-Kung Kim, Seoul (KR); Sung-Gi Min, Kyungki-Do (KR)

(73) Assignee: LG Electronics Inc., Seoul (KR)

(*) Notice: Subject to any disclaimer, the term of this patent is extended or adjusted under 35 U.S.C. 154(b) by 844 days.

(21) Appl. No.: 09/736,191

(22) Filed: Dec. 15, 2000

(65) Prior Publication Data

US 2001/0024442 A1 Sep. 27, 2001

(30) Foreign Application Priority Data

Dec. 18, 1999 (KR) .......................................... 1999-59048

(51) Int. Cl.[7] ........................ H04L 12/28; G06F 15/16
(52) U.S. Cl. ...................... 370/398; 709/208; 709/230
(58) Field of Search ......................... 370/256, 257, 370/392, 395.1, 395.2, 395.5, 398, 254, 255, 258; 709/208, 209, 220, 230, 248, 222

(56) References Cited

U.S. PATENT DOCUMENTS

| | | | | |
|---|---|---|---|---|
| 5,193,186 A | * | 3/1993 | Tamaki et al. | 718/106 |
| 5,678,006 A | * | 10/1997 | Valizadeh et al. | 709/223 |
| 5,822,422 A | * | 10/1998 | Daase et al. | 379/269 |
| 5,956,344 A | * | 9/1999 | Cole | 370/465 |
| 6,097,807 A | * | 8/2000 | Leslie et al. | 379/269 |
| 6,407,997 B1 | * | 6/2002 | DeNap et al. | 370/352 |
| 6,434,612 B1 | * | 8/2002 | Hughes et al. | 709/223 |
| 6,690,656 B1 | * | 2/2004 | Christie et al. | 370/286 |

OTHER PUBLICATIONS

RFC 2297, Newman et al, Ipsilson's General Switch Management Protocol Specification, version 2.0, Mar. 1998.*

* cited by examiner

*Primary Examiner*—Afsar Qureshi
(74) *Attorney, Agent, or Firm*—Fleshner & Kim, LLP (57) ABSTRACT

A control program structure and its method are disclosed which is capable of controlling a hardware source of an ATM switching system from an external source through a standard interface. The control program structure of an ATM switching system including: a GSMP master function unit mounted on a processor board existing at an external source of an ATM switching system, for performing a master function of a GSMP (general switch management protocol); a protocol processing function unit mounted on a processor board inside a switching system, for processing a slave function of a GSMP; and a plurality of resource control function units each mounted on processor boards distributed in the switching system, for controlling a hardware resource of the system according to a request message of the protocol processing function unit.

20 Claims, 6 Drawing Sheets

CONTROL PROGRAM STRUCTURE OF ATM SWITCHING SYSTEM AND METHOD THEREOF

BACKGROUND OF THE INVENTION

1. Field of the Invention

The present invention relates to an ATM switching system, and more particularly, to a control program structure which is capable of controlling a hardware source of an ATM switching system from an external source through a standard interface, and a method thereof.

2. Description of the Background Art

FIG. 1 is a view showing a construction of a conventional ATM switching system which includes a plurality of processor boards 10~12, an ATM switch 14 and line interface cards 13 and 15.

As shown in FIG. 1, the conventional ATM switching system includes a plurality of processor boards 10~12, and a control program is mounted on each processor board. Accordingly, the control program is implemented suitable to a hardware structure of the switching system to control the ATM switch 14, the line interface cards 13 and 15, and other configuration devices.

Figure 2:
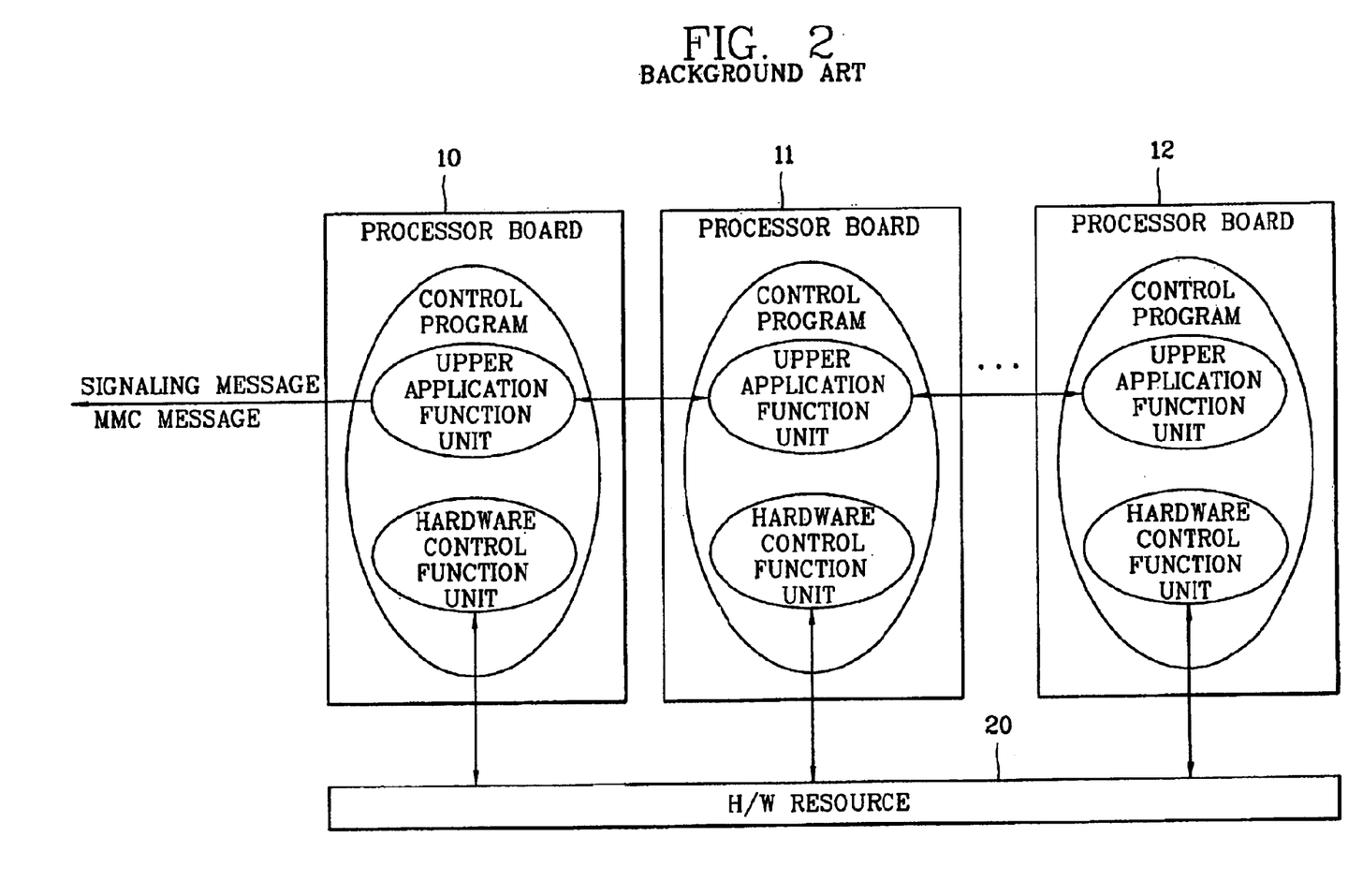
FIG. 2 is a view showing a structure of a control program for controlling a hardware resource of the ATM switching system in accordance with the conventional art.

FIG. 2 illustrates a general control program structure for controlling a hardware resource 20 of the ATM switching system in accordance with the conventional art.

As shown in the drawing, the general control program consists of an upper application function unit for exchanging a signaling message with the external source and analyzing and processing a protocol and a HMC (human machine command), and hardware control function unit for actually controlling the hardware resource 20 according to the analysis of the upper application function unit. In this respect, the hardware control function unit is implemented suitable to the hardware characteristics of the switching system.

In this manner, the conventional control program performs a connection establishing, a connection releasing, a state managing, a configuration controlling and other operation maintenance of the switching system by analyzing a signaling message inputted from an external source or a HMC (human machine command) inputted through a HMI (human machine interface) by an operator.

However, the control program of the general ATM switching system in accordance with the conventional art is fixedly implemented just suitable to the characteristics of the hardware of its pertinent switching system. Thus, in order to control other ATM switching systems, a control program should be rewritten to be suitable to the corresponding ATM switching system.

In addition, in case of correcting a function in the control program of the conventional ATM switching system or adding a new function thereto, since its upper function unit and a low function unit are affected altogether, correction to a developed program becomes very complicated.

And, as the communication technique is being developed, various kinds of brand-new switching systems and communication protocols come out, and various functions are required. Consequently, development of a control program suitable to each switching system and a communication protocol requires much time and much expense.

SUMMARY OF THE INVENTION

Therefore, an object of the present invention is to provide a control program structure of an ATM switching system which is capable of controlling a hardware resource from an external source outside the switching system by using a standard interface protocol, and its method.

Another object of the present invention is to provide a control program structure of an ATM switching system which is capable of implementing an application program regardless of a hardware resource of a switching system to thereby support various protocols, and its method.

Still another object of the present invention is to provide a control program structure of an ATM switching system in which a protocol processing function unit and a resource control function unit are separately implemented to thereby facilitate function correction and function addition, and its method.

To achieve these and other advantages and in accordance with the purpose of the present invention, as embodied and broadly described herein, there is provided a control program structure of an ATM switching system including: a GSMP master mounted at a processor board existing outisde an ATM switching system, for performing a master function of a GSMP (general switch management protocol); a protocol processing function unit mounted on a processor board of a switching system, for processing a slave function of a GSMP; and a plurality of resource control function units mounted on each processor board distributed in the switching system, for controlling a hardware resource of the switching system according to a request message of the protocol processing function unit.

In order to achieve the above object, there is also provided a method for controlling a hardware resource of an ATM switching system including the steps of: transmitting a resource control message to a protocol processing function unit of an ATM switching system through a GSMP master; analyzing the type of request of the transmitted resource control message and transmitting the resource control message to a resource control function unit which actually controls a corresponding hardware resource; and analyzing a received resource control message to actually perform a controlling operation on the hardware resource.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a view showing a structure of an ATM switching system in accordance with a conventional art;

DETAILED DESCRIPTION OF THE PREFERRED EMBODIMENTS

Figure 3:
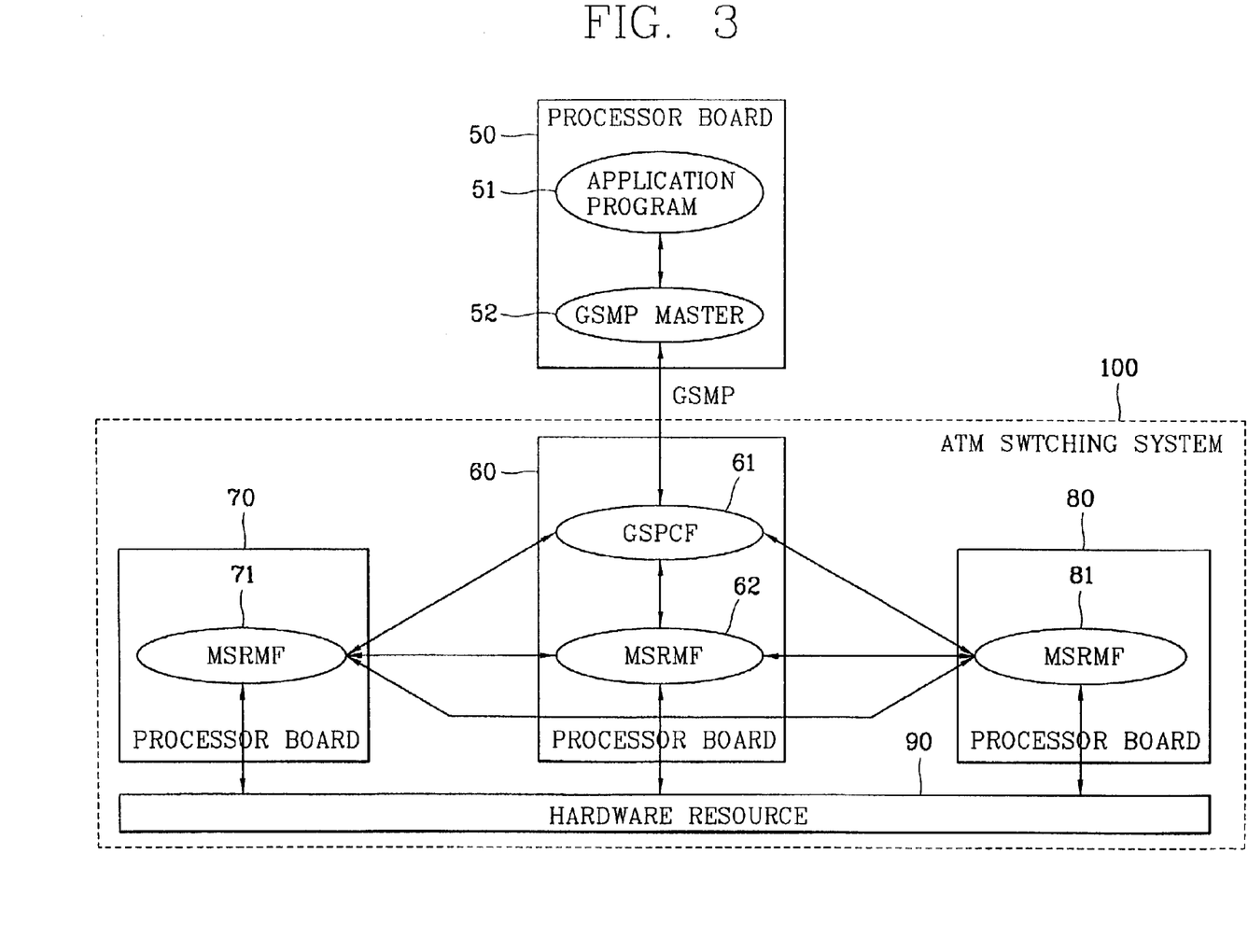
FIG. 3 is a view showing a structure of a control program of an ATM switching system in accordance with the present invention.

Reference will now be made in detail to the preferred embodiments of the present invention, examples of which are illustrated in the accompanying drawings, FIG. 3 is a view showing a structure of a control program of an ATM switching system in accordance with the present invention.

As shown in the drawing, the control program of an ATM switching system in accordance with the present invention is structured in that an application program 51 controlling a switching system is implemented in a processor board 50 of an external source to the switching system, and a control program for actually controlling a hardware resource 90 is implemented in each processor board 60~80 in the switching system. For interfacing between the switching system and an external source, a GSMP (general switch management protocol), a standard interface protocol is adopted. As a standard interface protocol, the GSMP has a master-slave structure that is capable of controlling the switching system from an external source.

A GSMP master 52 is mounted at a processor board 50 placed outside the switching board, and an application program controls the switching system by using the GSMP master 52. The ATM switching system 100 includes a protocol control function unit (GSPCF: GSMP Slave Protocol Control Function) 61 that has a GSMP slave function and a plurality of resource control function units (MSRMF: Multiservice Switch Resource Management Function) 62, 71 and 81 that actually control the hardware resource of the switching system.

That is, in the present invention, GSPCF 61 interworking with the external source of the switching system is independently implemented with respect to the MSRMF which actually controls the switching system.

The GSPCF 61 is a software block for performing a slave protocol function of the GSMP and is mounted to be operated at one of the plurality of processor boards 60, 70 and 80 of the ATM switching system.

The GSPCF 61 receives a message transmitted by the GSMP master 52 and performs a control function for the ATM switching system 100 through the MSRMFs 62, 71 and 81 distributed in each processor board 60~80.

In addition, the GSPCF 61 collects the messages received from each MSRMF 62, 71 and 81 and transmits it to the GSMP master 52. For this purpose, the GSPCF 61 maintains synchronization with the GSMP master 52 and the MSRMFs 62, 71 and 81 to keep and manage the whole configuration information of the switching system.

Initially, the GSPCF 61 performs synchronization procedure with respect to the interworking blocks (the MSRMF, the GSMP master) and then it processes a subsequent procedure while transmitting and receiving messages to and from the corresponding interworking blocks.

In addition, the GSPCF 61 analyzes the received message and generates a child-process for performing a suitable function according to the type of message, to thereby perform a corresponding message. Accordingly, the GSPCF 61 can simultaneously process in parallel the plurality of messages and the generated child-process becomes automatically extinct as the message is completely processed. At this time, the GSPCF 61 includes 9 software units, of which each operation is as follows.

1) main_GSPCF

A main_GSPCF is a process block which is the first generated as the GSPCF 61 is activated.

2) GSMP_init Unit

A GSMP_init unit is an independent process block generated by the main_GSPCF, which is bonded and synchronized with the MSRMFs 62, 71 and 81 distributed in each processor board of the switching system 100.

When the synchronization is completed, the GSMP_init unit collects the distributed configuration information from the MSRMFs 62, 71 and 81 so that the main_GSPCF can keep and manage the configuration information of the overall switching system, and when the whole configuration information completely collected, the GSMP_init unit transmits a synchronization completion message to the main_GSPCF.

The GSMP_init unit is successively operated, and when a new synchronization message is received from the MSRMFs 62, 71 and 81 during the operation, the GSMP_init unit performs a function of correcting the whole system configuration information. In this respect, the whole configuration information includes a pair of logical configuration information and physical configuration information which is identical to the actual hardware resource, Accordingly, since the GSMP_init unit has the actual physical configuration information mapped with the logical configuration information, when the GSMP master 52 transmits a control request message for the logical configuration to the GSMP_init unit, the GSMP_init unit searches the MSRMF for controlling a corresponding physical configuration information and transmits a control message to the GSMP master 52.

3) GSMP_start

A GSMP_start is a subroutine called by the main_GSPCF, performing a function of synchronizing with the GSMP master 52 positioned at a processor board 50 existing outside the switching system. When synchronizing is completed, it returns so as for the main_GSPCF to successively perform its operation 4) GSMP_main GSMP_main is a subroutine called and executed by the main_GSPCF, always being in a standby state for receiving a message (a protocol message from the GSMP master or an IPC message from the MSRMF). When the protocol message is received, the GSMP_main calls a GSMP_protocol to check a protocol error. Upon checking, if there is no protocol error, the GSMP_main discriminates the type of the received message and generates a suitable child-process to process the received message. Thereafter, the GSMP_main returns to the standby state to receive the next message.

5) GSMP_protocol

A GSMP_protocol is a subroutine called by the GSMP_main, performing a function for checking a protocol error of the received message.

6) GSMP_conn

A GSMP_conn is a child-process generated in case that the message received by the GSMP_main is a connection management request message transmitted from the GSMP master 52. The GSMP_conn refers the whole configuration information created by the main_GSPCF to identify the MSRMF which manages the port(input/output port) included in the received message indicates, and transmits the corresponding connection control message to the identified MSRMF. Thereafter, when a response message for the connection control request is received from the corresponding MSRMF, the GSMP_conn transmits the result to the GSMP master 52 and then becomes extinct.

7) GSMP_statistics

A GSMP statistics is a child-process generated in case that a received message is a statistics request message transmitted from the GSMP master 52. The GSMP_statistics refers to the whole configuration information created by the main_GSPCF, to identify the MSRMF which manages the port included In the received message indicates, and transmits the corresponding statistics request message to the identified MSRMF, so that statistics processing function can be performed. Thereafter, when a response message for the statistics request message is received from the corresponding MSRMF, the GSMP_statistics transmits the result to the GSMP master 52 and then becomes extinct.

8) GSMP_config

A GSMP_config is a child-process generated in case that a message received by the GSMP_main is a configuration request message from the GSMP master 52 or a configuration change informing message from the MSRMF. In case that the received message is a configuration request message, the GSMP_config refers to the whole configuration information which is kept and managed by the main_GSPCF and transmits a response message to the GSMP master 52. Meanwhile, in case that the received message is a configuration change informing message, the GSMP_config changes the whole configuration information managed by the main_GSPCF and transmits the changed content in an event message form to the GSMP master and then becomes extinct.

9) GSMP_status

A GSMP_status is a child-process generated in case that a received message is a state change message informing that the port state has been changed, received from the MSRMF. When the state change message is inputted, the GSMP_status changes the state information of the corresponding port in the whole configuration information managed by the main_GSPCF, transmits the changed content in an event message form to the GSMP master and then becomes extinct.

The MSRMFs 62, 71 and 81 are software blocks mounted and operated at the processor boards distributed in the ATM switching system 100, which are integrally managed by the GSPCF 61. Each MSRMF 62, 71 or 81 performs only control function for a resource managed by itself among hardware resources of the whole switching system, and performs a function through interworking with each other if necessary.

For example, in case that a resource control message is a message (a connection control message) for a hardware resource managed by a different MSRMF 81, the MSRMF 71 interworks with the MSRMF 81 which controls the corresponding resource, to perform a connection control function. At this time, each MSRMF includes three software units, of which operations are as follows.

1) MSRMF_main

MSRMF_main is a process which is the first generated when the MSRMF is activated. MSRMF_main access to a database (DB) to read information on the hardware resource which is managed by itself, and keeps and manages local configuration/state information. And, the MSRMF_main is bound up and synchronized with the GSPCF 61, and transmits the local configuraiton information to the GSPCF 61 so that the GSPCF 61 generates an whole configuration information of the switching system and keeps and manages the same.

Thereafter, the MSRMF_main turns to an IPC (Inter-Process Communication) message standby state. In this state, when a message is received from the GSPCF 61 or from the operation maintenance block, the MSRMF_main checks an error of the received message and then generates a proper child_process according to the type of the received message. And then, the MSRMF_main is transited to the message standby state to wait for the next message.

In other words, in case that the received message is a connection control message from the GSPCF 61, the MSRMF_main generates a CRMSF (Connection Resource Management Sun-Function), while, the received message is a statistics request message from the GSPCF 61 or a configuration/state/statistics message from the operation maintenance block, the MSRMF_main generates a CSMSF (Configuration Statistics Management Sub-Function). Accordingly, since a child_process is generated for every received message, the MSRMF_main is capable of process a parallel message, and as the corresponding message is completely processed, the corresponding child_process becomes extinct.

2) CRMSF

A CRMSF is a child_process generated in case that the MSRMF_main receives a connection control request message from the GSPCF 61. The child_process performs establishing, releasing and maintaining of connection and is divided into a block for processing a logical portion and a block for processing a physical portion.

3) CSMSF

A CSMSF is a child_process generated in case that the MSRMF_main receives a statistics request message or a configuration/state change informing message of an operation maintenance block from the GSPCF 61. When a statistics request message is received, the CSMSF transmits the statistics request message to a line interface card(LIC) F/W (Firmware) and then transmits a statistics received from the LIC to the GSPCF 61. Meanwhile, in case that a configuration/state change informing message is received, the CSMSF changes the local configuration/state information which is managed by the MSRMF, transmits a configuration/state change informing message to the GSPCF 61 and becomes extinct.

The control program structure of the ATM switching system constructed as described above will now be explained with reference to the accompanying drawings.

The GSMP is a protocol standardized in an IETF (Internet Engineering Task Force), of which each message form and parameters are described in the standard documents of RFC (Request For Comment) 1987 and 2297. Accordingly, in the present invention, in case of the GSMP, the control program was made on the basis of the standard document.

Figure 4:
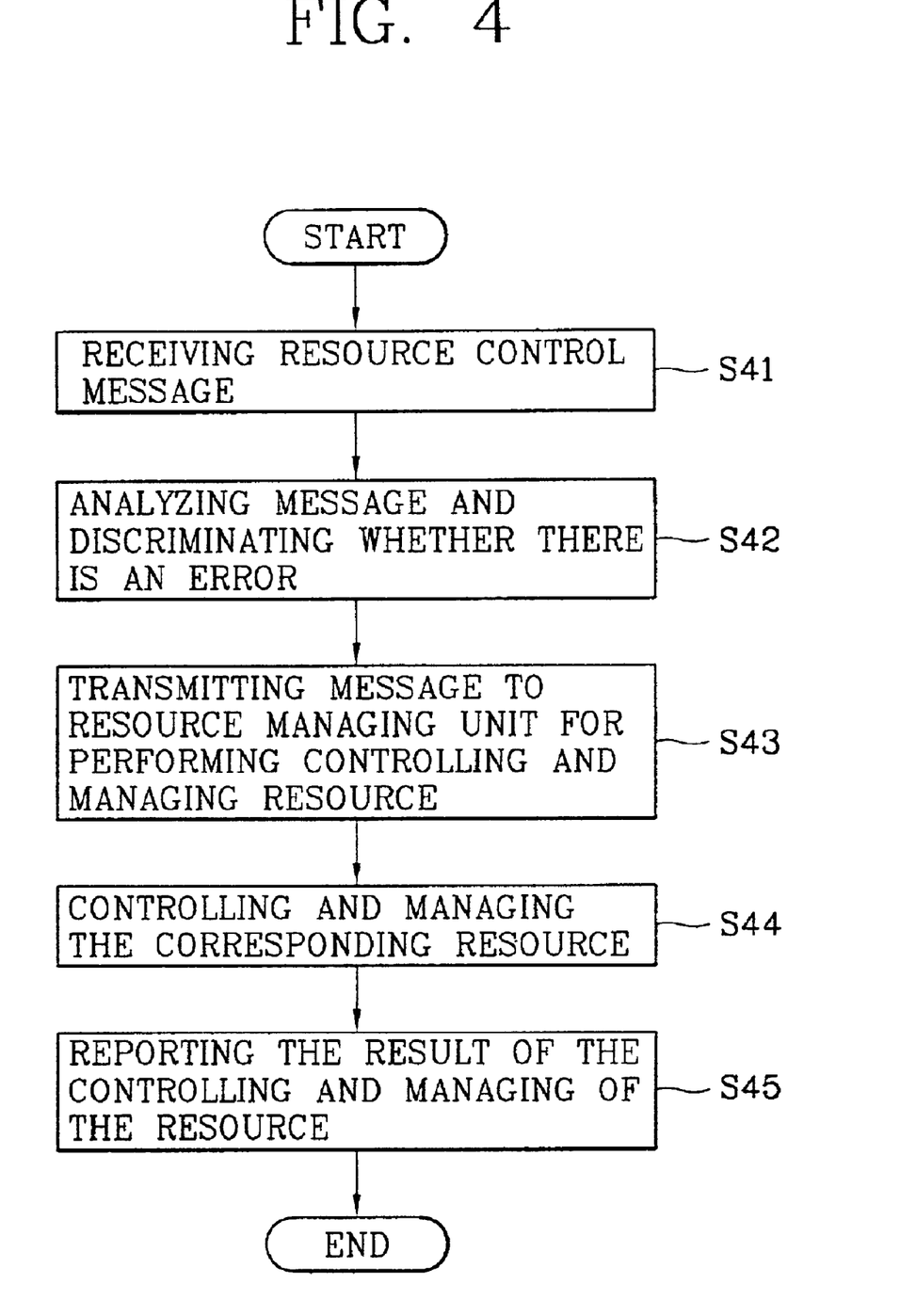
FIG. 4 is a flow chart for controlling a hardware resource of FIG. 3 in accordance with the present invention.

With reference to FIG. 4, when a resource control message is received from the GSMP master 52 (S41), the GSPCF 61 discriminates an error of the received resource control message and analyzes port information (an input/output port) included in the corresponding message (S42). Upon analyzing, the GSPCF 61 transmits the resource control message back to the MSRMF which manages a corresponding port, that is, for example, to the MSRMF 71 among the MSRMFs 62, 71 and 81 (S43).

Upon receipt of the message, the MSRMF 71 analyzes the corresponding message, generates a child-process for performing an appropriate function according to the type of the message (a connection control message, a statistics request message or a configuration request message) and processes the corresponding message (S44).

At this time, the received resource control message is a connection control message, the MSRMF 71 interworks with the MSRMF (62 or 81) which controls the corresponding resource, to perform the connection control function.

Accordingly, each child-process processes the resource control message received from the GSMP master 52 and transmits its result to the GSPCF 61, and the GSPCF 61 transmits a protocol message to the GSMP master 52 to report the resource controlling and performing result (S45).

Figure 5:
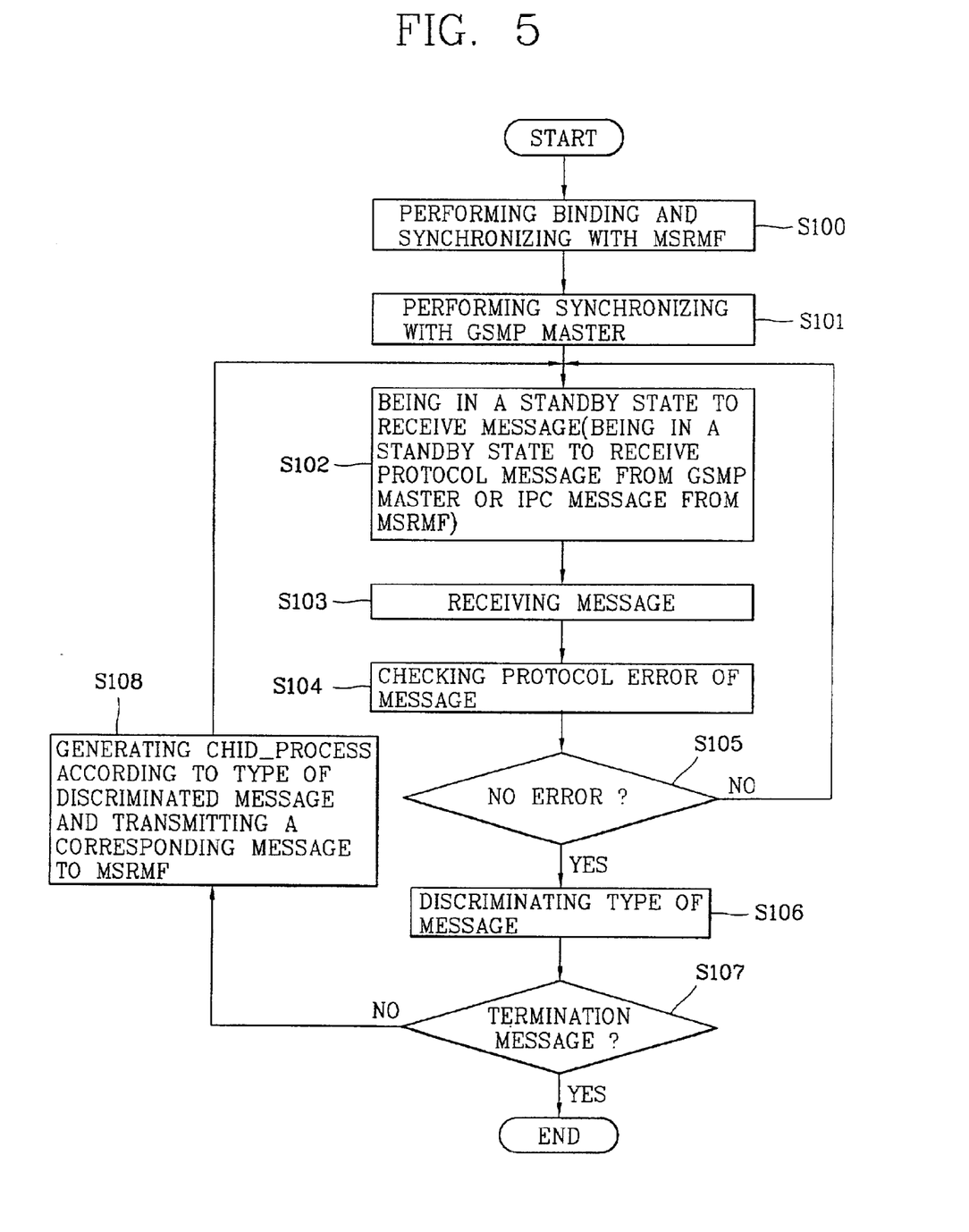
FIG. 5 is a flow chart of an operation of a protocol processing function unit (GSPCF) of FIG. 4 in accordance with the present invention.

The control message processing of the ATM switching system will now be described in detail with respect to FIG. 5.

When the GSPCF 61 is activated, the main_GSPCF generates a child_process of GSMP_init and is bound up and synchronized with the MSRMFs 71, 62 and 81 (S100). When the synchronization is completed, the GSMP_init collects configuration information distributed from each MSRMF 62, 71 and 81 and transmits it with the synchronization completion message to the main_GSPCF.

Upon receipt of the synchronization completion message from the GSMP_init, the main_GSPCF calls the GSMP_start unit and performs synchronization with the GSMP master 52 (S101). When the synchronization with the GSMP master 52 is completed, the main_GSPCF calls the GSMP_main and turns to the standby state for receiving the protocol message from the GSMP master 52 or the IPC messge from the MSRMFs 71, 62 and 81 (S102).

Thereafter, when the protocol (the resource control) message is received from the GSMP master 52 (S103), the GSMP_main calls the GSMP_protocol unit to check a protocol error (S104, S105). Upon checking, if there is no error, the GSMP_main discriminates the type of the received message, generates an appropriate child-process according to the type of the message and transmits the received message to the corresponding MSRMF (S106, S107).

Meanwhile, if the received message is an operation termination message of the GSPCF 61, the GSMP_main terminates the whole operation. Thereafter, the GSMP_main unit returns to the message receiving standby state and waits for the next message.

In detail, upon discrimination, in case that the received message is a connection control message from the GSMP master 52, the GSMP_main generates a GSMP_conn. The GSMP_conn checks to which MSRMF's port the port information (input/output port) included in the received message is related, by referring to the whole configuration information created by the main_GSPCF and transmits the connection control message to the corresponding MSRMF, that is, for example, to the MSRMF 71 so that the connection control function can be performed. Thereafter, when a response message is received from the corresponding MSRMF 71, the GSMP_conn transmits the result to the GSMP master 52 and then becomes extinct.

Meanwhile, upon discrimination, in case that the received message is a statistics request message from the GSMP master 52, the GSMP_main generates a GSMP_statistics and processes the request message. The GSMP_statistics identifies a MSRMF to process the corresponding received message by referring the whole configuration information created by the main_GSPCF and transmits the statistics request message to the MSRMF, that is, for example, the MSRMF 62 so that the statistics processing function can be performed. Thereafter, when a response message is received from the corresponding MSRMF 62, the GSMP_statistics transmits the result to the GSMP master 52 and then becomes extinct.

In case that the received message is a configuration request message transmitted from the GSMP master 52 or a configuration change informing message transmitted from the MSRMF, the GSMP_main generates a GSMP_config and processes the request message.

In case that the received message is the configuration request message from the GSMP master 52, the GSMP_config transmits a response message to the GSMP master 52 by referring to the whole configuration information created by the main_GSPCF Meanwhile, in case that the received massage is a configuration change informing message transmitted from the MSRMF, the GSMP_config changes the whole configuration information managed by the main_GSPCF, transmits the changed content in an event message form to the GSMP master 52, and then becomes extinct.

In case that the received message is a state change message transmitted from the MSRMF, that is, a message informing that the port state of the MSRMF has been changed, the GSMP_config changes the state information of the corresponding port of the whole configuration information managed by the main_GSPCF, transmits the changed content in the event message form to the GSMP master 52, and then becomes extinct.

Figure 6:
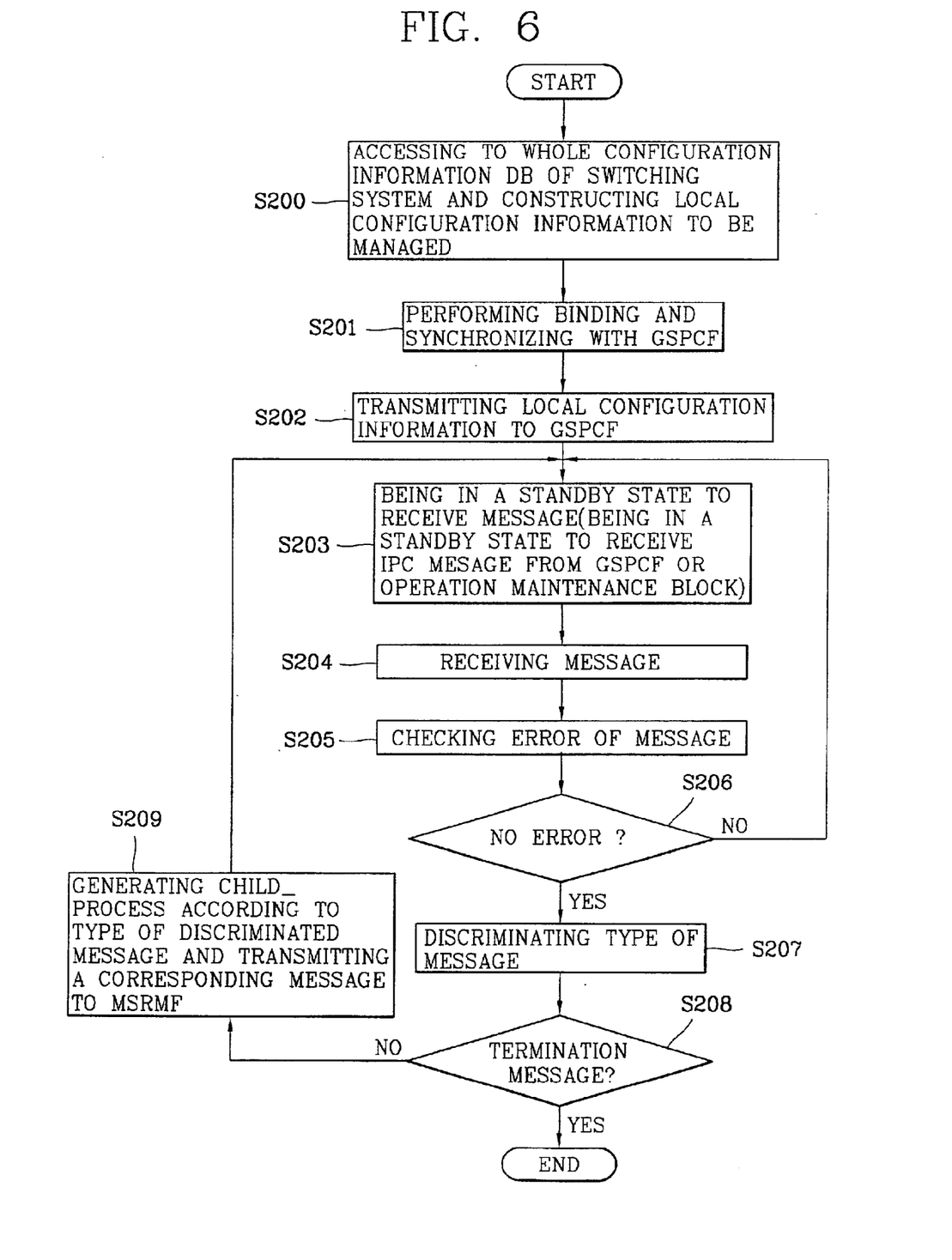
FIG. 6 is a flow chart of an operation of a resource control function unit (MSRMF) of FIG. 4 in accordance with the present invention.

Meanwhile, when the MSRMF is activated, the MSRMF_main accesses to the database (DB) to read information on the hardware resources managed by itself and keeps and manages the local configuration/state information (S200). Thereafter, the MSRMF_main is bound up and synchronized with the GSPCF 61 and transmits the local configuration information to the GSPCF 61, so that the GSPCF 61 generates the whole configuration information of the switching system and keeps and manages it (S201, S202). And then, the MSRMF_main turns to an IPC message receiving standby state (S203).

In the receiving standby state, when a message is received from the GSPCF 61 or from the operation maintenance block, the MSRMF_main checks an error of the received message. If there is no error, the MSRMF_main discriminates the type of the received message (S204~S207). Upon discrimination, in case that the received message is a termination message, the MSRMF_main terminates the whole operation (S208), meanwhile, in case that the received message is not a termination message, the MSRMF_main generates an appropriate child_process according to the type of the discriminated message to process the received message, and then is transited to a message receiving standby state (S209).

That is, in case that the received resource control message is a connection control message transmitted from the GSPCF 61, the MSRMF_main generates a child-process of CRMSF to perform establishing, releasing and maintaining function of connection, while, in case that the received message is a statistics request message transmitted from the GSCPC 61 or a configuration/state change informing message transmitted from the operation maintenance block, the MSRMF_main generates a child_process to process the corresponding message.

Accordingly, each child-process transmits the process result for the resource control message to the GSPCF 61, and the GSPCF 61 transmits a response message to the GSMP master 52 and completes processing the resource control message.

Consequently, the GSMP master 52 receives the response message and informs the application program 51 of the completion of the resource control operation and terminates the processes.

The present invention is not limited to the GSMP and can be adopted to other standard protocols in the same manner.

As so far described, according to the present invention, the application program for controlling the switching system is implemented at a processor board of an external source to the switching system, and the control program for actually controlling the hardware resource of the switching system is implemented at the internal board of the switching system. Therefore, any complicate application program can be implemented at an external processor board (a general workstation), and especially, since an application program is implemented regardless of a hardware various protocols can be supported.

In addition, the resource control function unit of the present invention is implemented suitable to the hardware characteristics of the switching system, and as far as concerned to interfacing between the external source and the switching system, it is implemented to conform the standard protocol such as the GSMP. Consequently, the resource control function unit is free from affecting even if the application program is changed or added, so that a function can be easily added or corrected afterwards.

Moreover, in the control program structure of the ATM switching system of the present invention, the protocol control function unit (GSPCF) is separatedly implemented from the resource control function unit (MSRMF). Accordingly, in case where a different standard protocol is applied afterwards it is necessary to change only the GSPCF, so various control protocols can be supported. Also, in case where the resource control function of the switching system is to be changed, it is necessary to correct only the resource control function unit.

And, in the control program structure of the ATM switching system of the present invention, the resource control function units (MSRMFs) are distributededly implemented in processor boards. Accordingly, the control program structure of the present invention is easily adoptable to a switching system having a plurality of processor boards. Especially, since load to the resource control function unit can be reduced, a performance of the switching system can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A control program structure of an ATM (Asynchronous Transfer Mode) switching system comprising:
    a master function unit mounted at a processor board existing outside a switching system;
    a protocol processing function unit mounted at a processor board existing in the switching system; and
    a plurality of resource control function units respectively mounted within each processor board and for receiving a control request message through the protocol processing function unit from the master function unit and controlling a hardware resource of the switching system,
    wherein the protocol processing function unit and the resource control function units are separately implemented from each other such that the protocol processing function unit or a corresponding resource control function unit may be upgraded without modifying the other respective function unit.

2. The structure according to claim 1, wherein the master function unit performs a master function of a standard protocol and the protocol processing function unit performs a slave function of the standard protocol.

3. The structure according to claim 2, wherein the standard protocol is a general switch management protocol.

4. The structure according to claim 1, wherein the protocol processing function unit is mounted at only one of said each processor board, and the plurality of resource control function units are separately mounted at each processor board of the switching system.

5. The structure according to claim 4, wherein the plurality of resource control function units interwork with each other to be operated.

6. A control program structure of an ATM (Asynchronous Transfer Mode) switching system comprising:
    a master function unit for performing a master function of a standard protocol;
    an application program for controlling the ATM switching system through the master function unit;
    a protocol processing unit for interfacing with the master function unit through the standard protocol and processing a protocol message transmitted from the master function unit; and
    a plurality of resource control function units for analyzing a control request message outputted from the protocol processing unit and controlling and managing a hardware resource,
    wherein the protocol processing unit is independent of the plurality of resource control function units such that the protocol processing function unit or a corresponding resource control function unit may be upgraded without modifying the other respective function unit.

7. The structure according to claim 6, wherein the standard protocol is a general switch management protocol.

8. The structure according to claim 6, wherein the protocol processing unit is mounted at only one processor board within the switching system, and the plurality of resource control function units are separately mounted at each processor board of the switching system.

9. The structure according to claim 6, wherein the protocol processing unit analyzes port information included in the received control request message and transmits a corresponding resource control message to one of the plurality of resource control function units.

10. The structure according to claim 6, wherein the protocol processing unit generates a child process for performing an appropriate function according to the type of the control request message and processes the corresponding resource control message.

11. The structure according to claim 6, wherein the plurality of resource control function units interwork with each other to be operated.

12. A method for controlling a hardware resource of an ATM (Asynchronous Transfer Mode) switching system, comprising:
    receiving a resource control message through a standard protocol from a protocol master;
    transmitting a resource control message from a protocol processing function unit to one of a plurality of the resource control function units according to port information of a received resource control message; and
    performing a controlling operation for a hardware resource by the resource control function unit according to the type of the transmitted resource control message,
    wherein the protocol processing function unit operates independently from the resource control function units such that the protocol processing function unit or a corresponding resource control function unit may be upgraded without modifying the other respective function unit.

13. The method according to claim 12, wherein the standard protocol is a general switch management protocol and the protocol processing function unit performs a slave function of the standard protocol.

14. The method according to claim 12, wherein the protocol processing function unit is mounted at only one processor board within the switching system, and the plurality of resource control function units are separately mounted at each processor board of the switching system.

15. The method according to claim 12, wherein when the resource control message is a connection control message, the resource control function unit interworks with other resource control function units, to process the resource control message.

16. The method according to claim 12, wherein transmitting the resource control message comprises:

performing binding and synchronizing with the plurality of resource control function units;

performing synchronization with the protocol master;

being in a standby state for receiving the resource control message from the protocol master;

checking a protocol error of a message to discriminate the type of the message when the resource control message is received; and generating an appropriate child process according to the type of the message as discriminated and transmitting a corresponding resource control message to the resource control function unit.

17. The method according to claim 16, wherein the child process comprises:

a subroutine for transmitting a connection control request message;

a subroutine for transmitting a statistics request message;

a subroutine for processing a configuration request message or a configuration change informing message outputted from the resource control function unit; and a subroutine for processing a port state change informing message outputted from the resource control function unit.

18. The method according to claim 16, wherein the resource control message is transmitted to one of the plurality of resource control function units according to port information included in the control request message.

19. The method according to claim 12, wherein performing the controlling operation comprises:

performing binding and synchronizing with the protocol processing function unit;

transmitting configuration information of the switching system to the protocol processing function unit;

being in a standby state for receiving the resource control message from the protocol processing function unit;

checking an error of a corresponding message and discriminating the type of the message when the resource control message is received; and generating an appropriate child process according to the type of the message as discriminated and processing the corresponding resource control message.

20. The method according to claim 19, wherein the child process comprises:

a subroutine for processing a connection control request message; and a subroutine for processing a statistics request message or a configuration/state change informing message outputted from an operation maintenance block.

* * * * *